United States Patent [19]
Gard et al.

[11] 4,195,936
[45] Apr. 1, 1980

[54] ROTARY PRINTER AND ROTOR STRUCTURE

[75] Inventors: Leslie H. Gard; Darwin E. Phillips, both of Huntsville, Ala.

[73] Assignee: SCI Systems, Inc., Huntsville, Ala.

[21] Appl. No.: 846,549

[22] Filed: Oct. 28, 1977

[51] Int. Cl.[2] .......................................... G01D 15/18
[52] U.S. Cl. .................... 400/124; 400/119; 400/613; 400/636; 400/641; 400/658; 400/694; 346/162
[58] Field of Search ............... 400/124, 613, 636, 641, 400/708.1, 901, 119, 658, 694; 346/162, 163

[56] References Cited

U.S. PATENT DOCUMENTS

| | | | |
|---|---|---|---|
| 2,821,284 | 1/1958 | Garwood et al. | 400/708.1 X |
| 2,825,621 | 3/1958 | Alexander | 346/162 |
| 3,091,321 | 5/1963 | Ashworth | 400/708.1 |
| 3,816,839 | 6/1974 | Honda et al. | 346/163 |
| 3,854,563 | 12/1974 | Cowardin et al. | 400/124 |
| 3,997,903 | 12/1976 | Kelch et al. | 346/163 X |
| 3,998,315 | 12/1976 | Phillips | 400/124 |
| 4,022,311 | 5/1977 | Krull | 400/124 X |
| 4,032,930 | 6/1977 | Tauszig | 346/163 |

Primary Examiner—Ernest T. Wright, Jr.
Attorney, Agent, or Firm—Curtis, Morris & Safford

[57] ABSTRACT

This invention provides improved means for automatically retracting the styli away from the paper when the rotational speed of the rotor drops below a predetermined minimum level. Improved means also are provided for stably holding and accurately positioning the styli during printing. In addition, simple means are provided for adjusting the axial position of the styli to ensure proper character spacing. A snap-on housing protects the rotor and the retracted styli and allows the rotor and styli to be removed easily from the rotary printer as a single enclosed unit. An improved latch is provided for locking the rotor in one place on the drive shaft, but allowing the rotor to be removed relatively easily. The platen has a slight inclined area or ramp at the leading edge of the recording paper. The ramp smooths the travel of the styli on to the paper and increases the area of the paper which can be used for printing.

21 Claims, 9 Drawing Figures

ROTARY PRINTER AND ROTOR STRUCTURE

This invention relates to image recording and printing, and particularly to rotary printing. In its preferred embodiment, the invention is disclosed in use in a rotary printer of the type in which images are formed by electrical discharges selectively positioned on discharge-sensitive paper. This invention is an improvement upon the printer disclosed in U.S. Patent Application Ser. No. 611,785 filed Sept. 9, 1975 in the name of Olin B. King, now U.S. Pat. No. 4,100,551, and U.S. Pat. No. 3,998,315 issued Dec. 21, 1976 to Darwin E. Phillips. The disclosures of both patents hereby are incorporated herein by reference.

The printer of the above-identified U.S. Pat. No. 4,100,551 has a rotor and one or more electrically actuatable print members or styli secured to the rotor. Drive means are provided for rotating the rotor to move the styli across a record surface. Preferably, the record surface has the form of a strip of electrical discharge-sensitive paper which is wrapped part-way around the rotor when making contact with the styli. The paper strip is moved transversely across the rotor in a direction perpendicular to the plane of rotation of the rotor.

The styli used in such a printer preferably are thin, resilient wires which bear against the paper during the printing operation. While the operation of that printer is fast, smooth and efficient, and it is economical to build, it has been found that the styli, because they engage the paper, sometimes cause undesirable interference between the paper and the rotor when it is desired to remove the rotor from the printer for servicing or adjustment. Furthermore, when feeding a new strip of paper through the printer, snagging can be caused by the engagement between the styli and the paper.

The invention of the above-mentioned U.S. Pat. No. 3,998,315 solves the foregoing problems by providing an automatic retraction mechanism which automatically retracts the styli away from the paper when the speed of the rotor falls below a predetermined level. It is an object of the present invention to provide an improved automatic retraction mechanism—one which is even more simple and economical to build, and which is even more reliable than ever before.

In accordance with the present invention, these objects are met by the provision of a mechanism for retracting the styli by means of a resilient support member, one end of which is secured to the rotor in the manner of a cantilever beam, and the other end of which is used to support the styli. The support member is flexible so as to permit motion of the styli radially inwardly and outwardly with reference to the axis of rotation of the rotor. However, the support member is relatively stiff and inflexible in the direction of the axis of the rotor so as to ensure a stable axial location for the styli. Thus, the centrifugal force caused by rotation of the rotor automatically flexes the support member and throws the styli outwardly to the recording position. When the rotor speed falls below a certain minimum level, the styli are automatically retracted by the natural resiliency of the support member. The axial stiffness of the support member ensures that the styli always will meet the recording surface at almost exactly the same axial location.

Another object of the invention is to provide improved ease of adjustment and repair or replacement of the styli, and for improved stability of the parts of the printer after being adjusted. To this end there is provided a stop mechanism to limit the outward extension of the styli so as to stabilize the location of the styli during printing, regardless of the speed of rotation of the rotor.

Furthermore, to compensate for shifts in circumferential position resulting from styli wear or other causes, the present invention provides a means for adjusting the circumferential location of the styli while maintaining a constant angle between the extended styli and the recording sheet. A means for axially adjusting the styli also is provided.

The foregoing objects are further met by the provision of a housing which is attached to and encloses the rotor. The housing protects the rotor and the retracted styli, and facilitates the removal and installation of the rotor assembly for repair or replacement. 1

An improved latching means for securing the rotor to the drive shaft also is described. A latch on the rotor is pushed by a spring against a tapering flat recess on the drive shaft. Movement of the latch frees the rotor from the shaft. This locking arrangment ensures that the rotor always will be mounted on the shaft with the same orientation so that the stylus heads always have the same location relative to the drive shaft.

The rotary printers of the above-identified patents have cylindrical platens. The recording sheet passes over the inside surface of the platen. The styli ride on the inside surface of the platen, and then ride over the edge and onto the sheet. This creates a little bump in the motion of the styli and causes them to bounce. Thus, a short time delay is required to allow the vibrations of the styli to settle before printing can start. Although this delay is not particularly objectionable, it is desired to minimize it to increase the usable space on the record sheet.

The latter object is met by the provision of a very slight ramp on the platen leading up to the forward edge of the paper. The ramp depresses the styli until the tips are located at or slightly inwardly of the plane of the paper so that the styli experience either no radial movement or a slight outward movement when they move onto the paper. This reduces the bounce of the styli and enables them to start printing sooner after crossing the edge of the paper.

The foregoing and other objects and advantages of the invention will be set forth in or apparent from the following description and drawing.

GENERAL DESCRIPTION

Figure 1:
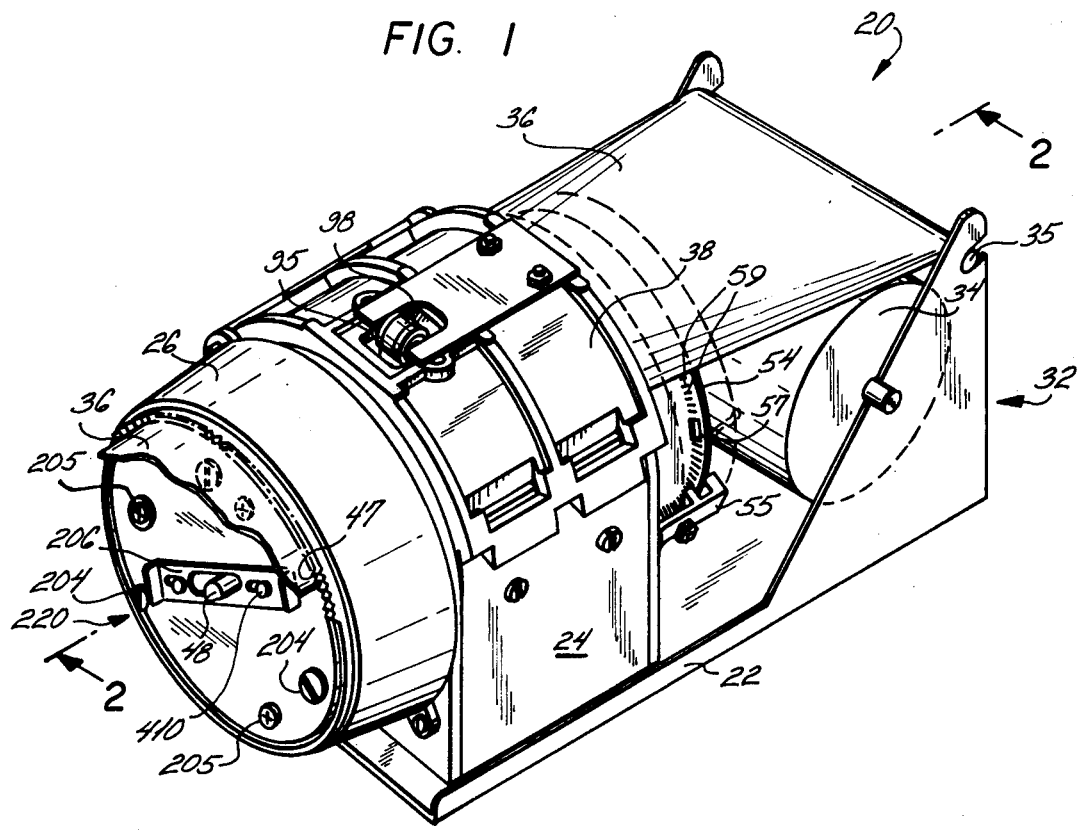
FIG. 1 is a perspective view of a printer constructed in accordance with the present invention.
Figure 2:
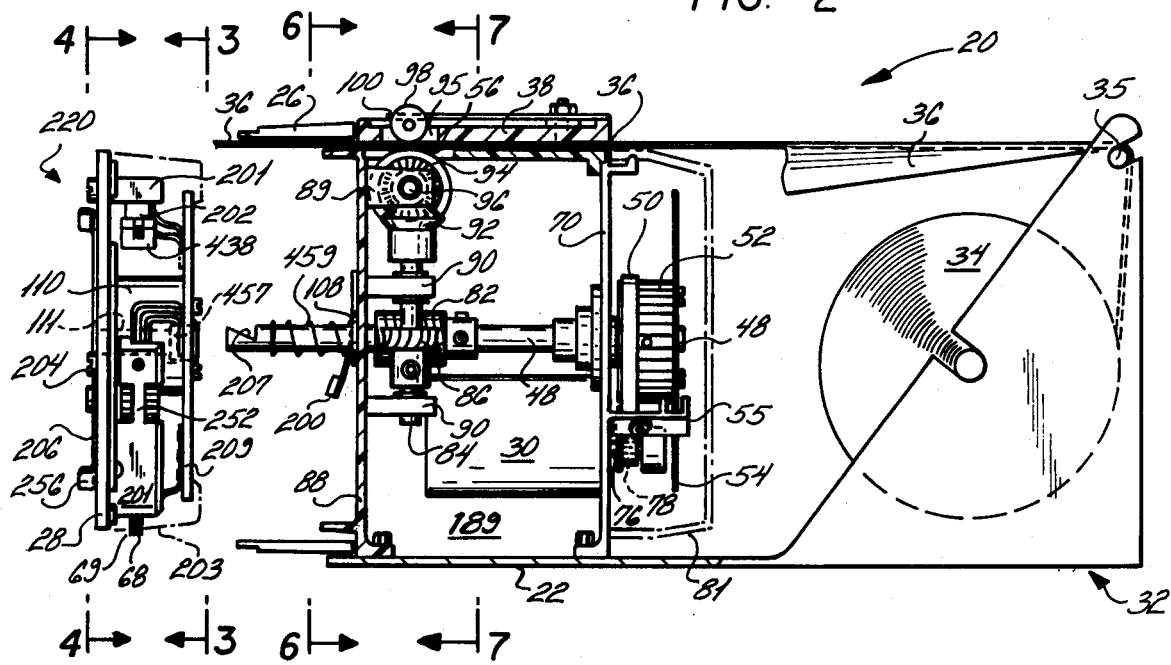
FIG. 2 is a cross-sectional view, taken along the line 2—2 of FIG. 1, with the rotor assembly removed from the printer.

FIGS. 1 and 2 show a rotary printer 20 which operates in substantially the same manner as the printer described in the aforementioned King U.S. Pat. No. 4,100,551, except as described hereinbelow.

The printer 20 includes a base plate 22, a printer housing 24, a nearly cylindrical sleeve 26 which is used as a platen, and a rotor assembly 220. Electro-sensitive paper 36 is stored in a roll 34, passes through the printer 20 in a horizontal direction, and emerges from the left end of the printer 20. A drive motor 30 (FIG. 2) rotates the rotor assembly 220 and simultaneously feeds the paper 36 through the printer 20, in a manner to be described in detail below. The rotor assembly 220 contains styli 68 (FIG. 2) which brush against the paper 36 and print characters on the paper 36.

Figure 7:
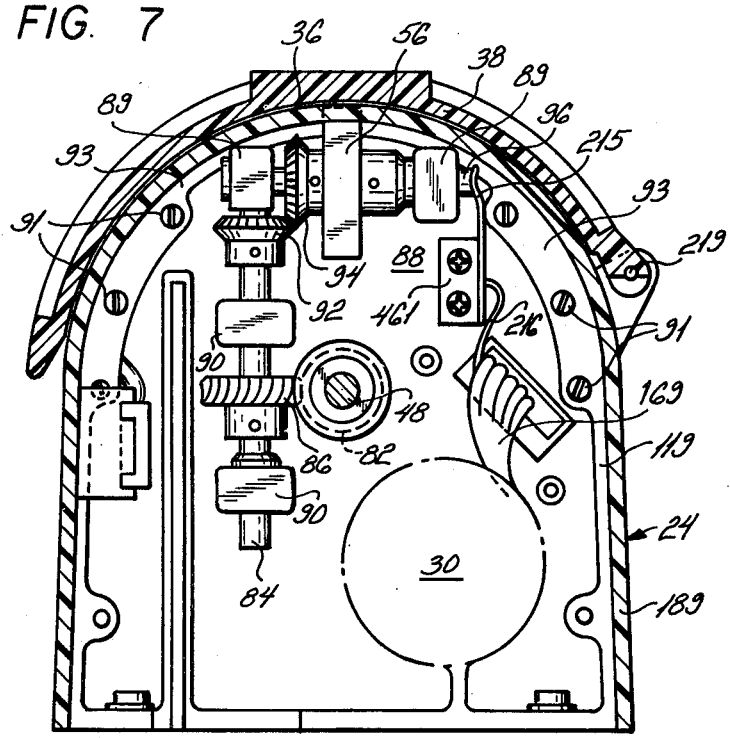
FIG. 7 is a cross-sectional view of the rotary printer taken along the line 7—7 of FIG. 2.

Referring now to FIGS. 1 and 2, the roll 34 of recording paper 36 is stored in a dispenser 32. The paper 36 passes upwardly from the roll 34 over a straight guide bar 35 towards a curved paper guide 38. As it is shown in FIG. 7, the guide 38 is hinged on a pin 219 to the outer surface of the housing 24, so that the guide 38 can be easily raised to facilitate the insertion of the paper 36 into the printer 20. As shown in FIG. 2, a drive roller 56 and an idler 98 are driven by the motor 30 to pull the paper 36 from the roll 34 and push it through the platen plane 26 and past the rotor assembly 220.

As the paper 36 is fed through the curved guide 38 the paper 36 forms an arc and is fed through the platen sleeve 26 along its uppermost inside surface. The printing is formed on the undersurface of the paper 36. The paper 36 bearing the printing emerges from the left end of the platen sleeve 26, which is provided with a serrated upper edge 47 to permit a length of the paper 36 to be torn off easily.

ROTOR CONSTRUCTION

Figure 3:
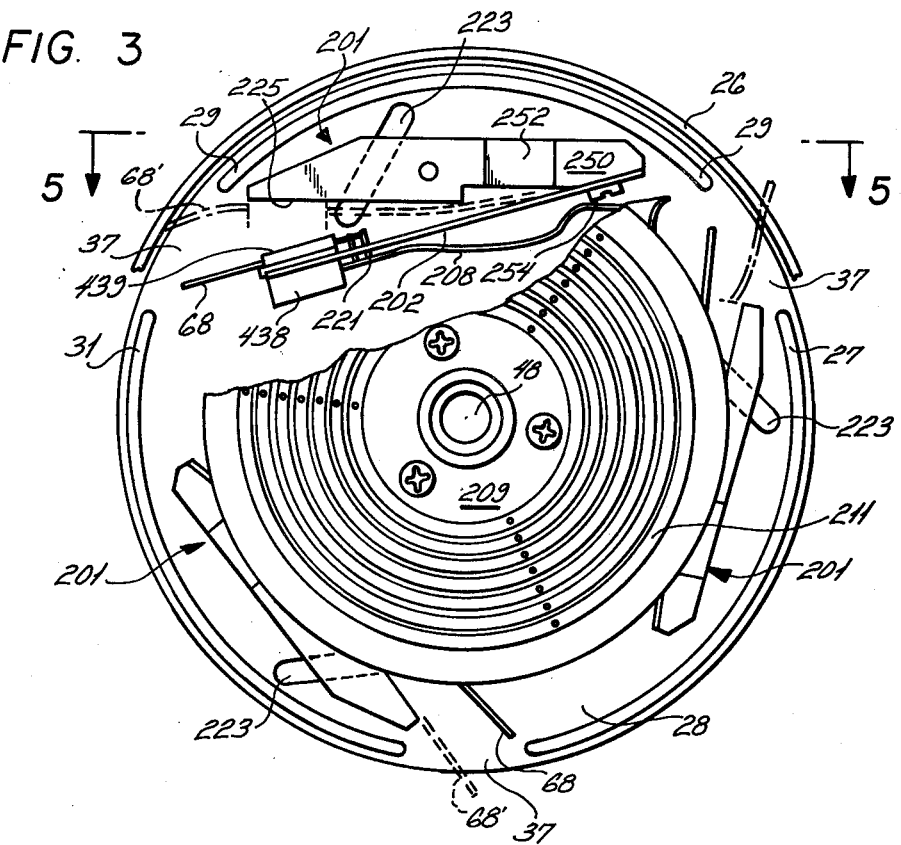
FIG. 3 is a rear elevation view of the rotor, taken along the line 3—3 of FIG. 2 and showing the commutator disc partially cut away to show one of the styli support members.

Referring now to FIGS. 2 and 3, and particularly to FIG. 3, the rotor assembly 220 includes a rotor 28. The rotor 28 has a hub 110 with a central hole 111 through which a drive shaft 48 extends. Mounted on the rotor 28 are three stylus support members 202, each of which supports five styli 68. Each stylus support member 202 is mounted on a support block 201 which is secured to the rotor 28.

A commutator disc 209 is mounted on the hub 110. A housing 203 (shown in dashed outline in FIG. 2) is attached to the rotor 28 and covers the area between the rotor 28 and the commutator disc 209, except for three holes 69 through which the styli 68 extend.

Figure 8:
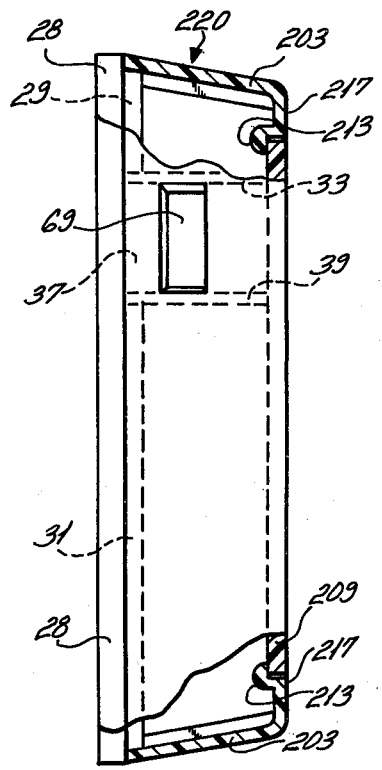
FIG. 8 is a partially broken-away, partially schematic side elevation view of the rotor assembly of the printer shown in FIGS. 1–7.
Figure 9:
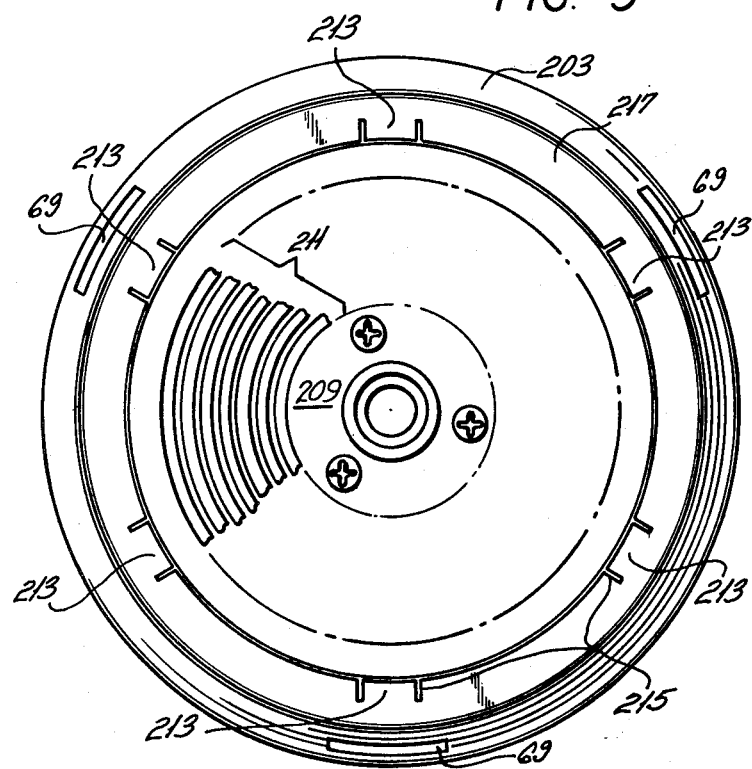
FIG. 9 is a rear elevation view of the assembly shown in FIG. 8.

FIGS. 8 and 9 show the rotor assembly 220 with its plastic housing 203 on. FIG. 8 is a side elevation view which is broken away at the top and bottom to show how the housing 203 is fastened in place.

The housing 203 is a rounded frustro-conical structure with a rear flange 217. A plurality of flexible resilient tabs 213 are formed by means of cuts 215 (FIG. 9) in the inner edge of the flange 217. As it is shown in FIG. 8, each tab 213 has an inwardly-extending bead which is spaced from the rear surface of the flange 217 by an amount sufficient to seat itself under the edge of the commutator disc 209. The front edge of the housing 203 abuts the rear surface of the rotor 28.

As it is shown in FIGS. 3 and 8, the rotor 28 has three semi-circular rearwardly-extending ridges, 27, 29 and 31. Only two of the ridges, 29, 31, are visible in FIG. 8. The ends of the ridges 27, 29 and 31 are spaced apart to form three symmetrically-located gaps 37, only one of which is visible in FIG. 8. The inside wall of the housing 203 has three pairs of axially-extending ridges. Only one pair 33,39 of the ridges is visible. The ridges 33,39 in each pair extend adjacent opposite edges of one of the three windows or holes 69 through which the styli 68 extend and retract. The spacing between the ridges 33,39 is such that the ends of the ridges 33,39 fit into one of the gaps 37. The housing 203 will not fit in place unless each pair of ridges 33,39 is located in one of the gaps 37. This ensures that each window 69 will be properly aligned with one set of styli 68.

The housing 203 can be fastened in place simply by aligning the ridges 33,39 properly, and pushing the flange 217 over the edge of the commutator disc 209 until the tabs 213 snap in place. The housing 203 can be removed easily by hand, simply by pulling the rotor 28 and housing 203 apart until the tabs 213 flex to release the housing 203.

From the foregoing, it can be seen that the rotor assembly 220 can be mounted on and removed from the drive shaft 48 as a single enclosed unit. This is advantageous in that it allows the rotor assembly 220 to be inserted and removed from the printer 20 with the assurance that the styli 68, the support means and the connecting leads will remain protected. The housing 203 also allows the rotor assembly 220 to be shipped to and from the manufacturer without extraordinary precautions in packing the rotor assembly 220, thereby facilitating repair and replacement of the styli 68.

STYLUS MOUNTING

Referring again to FIGS. 2, 3 and 5, each stylus head includes five closely-spaced parallel tungsten stylus wires 68 which are fastened together with epoxy or urethane plastic material. The styli support member 202 preferably is a relatively thin, wide flat fiberglass leaf spring which gives excellent flexibility towards and away from the platen sleeve 26, and at the same time remains substantially inflexible in a direction parallel to the surface of the platen sleeve 26. The plastic material used to fasten the styli 68 together is selected so as to retain the flexibility towards and away from the platen sleeve 26, as well as the inflexibility in the direction parallel to the platen sleeve 26.

Figure 5:
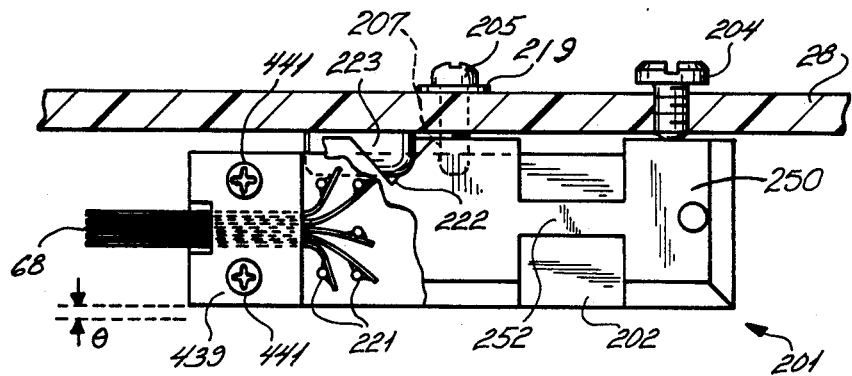
FIG. 5 is a broken-away cross-sectional view of a portion of the rotor, taken along the line 5—5 of FIG. 3.
Figure 6:
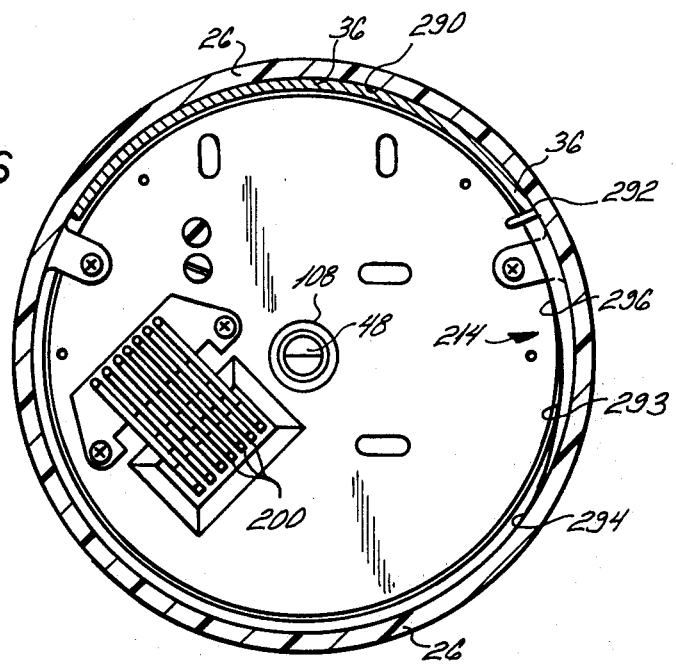
FIG. 6 is a cross-sectional view of the rotary printer taken along the line 6—6 of FIG. 2, with the rotor assembly removed from the printer.

As shown in FIGS. 3 and 5, the stylus wires 68 are bonded into a cap and header 439 which is an insulator and which clamps one end of the leaf spring 202 by means of screws 441 (FIG. 5) to a brass weight 438 (FIG. 3). The fiberglass of the leaf spring 202 also in an insulator, so that the styli 68 are mounted in an all-insulating structure. The rear ends of the styli 68 are splayed outwardly and soldered to a plurality of gold-plated Kovar pins 221 (FIG. 5) which extend through the spring 202 to a flexible cable 208 which is connected to a plurality of contact pads (not shown) on the rear of the commutator disc 209. Those pads extend through the disc 209 to make contact with the commutator rings 211 (FIG. 3) which conduct electrical energy to the styli 68 from the electrical control system (not shown) by way of brushes 200 (FIGS. 2 and 6).

The support block 201 is a relatively stiff molded plastic member which is secured to the rotor 28 by means of a screw 205 and a spline 223 (FIG. 5) on the rotor 28 which mates with a groove 222 in the block 201.

The block 201 provides a stop surface 225 (FIG. 3) against which the styli cap and header 439 on the end of the leaf spring 202 abuts when it flys outwardly due to centrifugal force. This seats the styli 68 securely and limits their outward extension under the influence of centrifugal force.

In operation, the stylus support spring 202 is biased so that the styli 68 are retracted inwardly to a non-recording position, which is shown in solid lines at 68 in FIG. 3. When the rotor 28 starts spinning, the initial angular acceleration acts to deflect the spring 202 toward the stop surface 225 of the support block 201, thereby swinging the styli 68 outwardly to the fully-recording position shown at 68'. The plane of the styli 68, when the styli 68 are in the recording position but are not bent, forms an angle of 30° to 45°, preferably 35°, with a tangent to the plane of the recording paper 36 at its intersection with the plane of the styli 68. The weight 438 is preferably selected so as to supply at least twice the centrifugal force required to throw the spring 202 and styli 68 into the recording position so that there is a substantial force urging the spring 202 against the stop surface 225 and to hold the styli 68 steady during printing.

ADJUSTMENT OF THE STYLI

Figure 4:
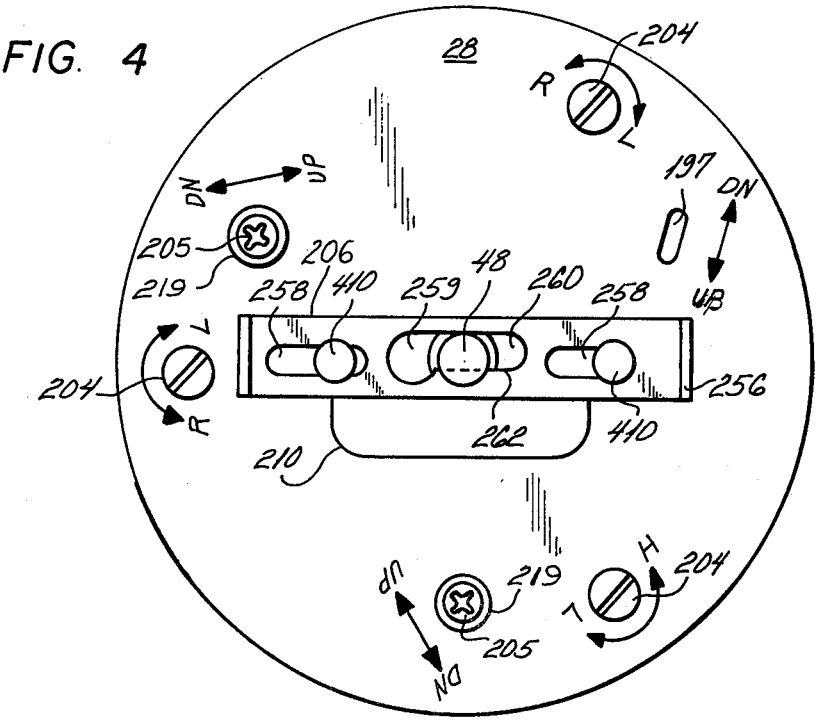
FIG. 4 is a front elevational view of the rotor, taken along the line 4—4 of FIG. 2, showing the latching means and screw adjusting means for the styli support members.

Referring to FIGS. 4 and 5, means are provided for making two adjustments of the styli 68.

First is the adjustment of the circumferential position of the styli 68. In FIG. 4, one of the screws 205 has been omitted to show a slot 197 through which the screws 205 pass. Each screw 205 is mounted with a bowed washer 219. Each screw 205 screws into a threaded hole 207 in the block 201. The circumferential position of the styli 68 can be adjusted by loosening the screw 205, sliding the block 201 which contains groove 222 to a new position on the spline 223, and tightening the screw 205. When the screw 205 is tightened the spline 223 and groove 222 are drawn together, rigidly securing the support block 201 to the rotor 28.

The spline and groove combination allows the adjustment to be made without changing the angle of the styli 68 with respect to the platen sleeve 26.

The second adjustment is in the axial position of the styli 68. The support block 201 has a rear portion 250 (FIG. 5) to which the right-handed end of the spring 202 is fastened by means of a screw 254 (FIG. 3). The end portion 250 is joined to the main portion of the block 201 by a connecting section 252 of reduced thickness.

Referring to FIG. 5, the end of the screw 204 bears against the side of the end portion 250 of the block 201. Turning the screw 204 moves the end 250 farther from or closer to the rotor 28. This causes the section 252 to bend (without permanent deformation) and causes the outer end of the spring 202 and the styli 68 to swing through a small angle $\theta$, thus changing the axial position of the styli 68. Thus, simply by turning the screws 204, the positions of the characters produced by each stylus group can be adjusted to give evenly spaced printed characters.

ROTOR MOUNTING AND DISMOUNTING

The rotor assembly 220 is mounted on the shaft 48 by means of the structure shown in FIG. 2.

Still referring to FIG. 2, the shaft 48 is provided with a tapered, flat recess 207. In its preferred form, the taper of the flat recess 207 is 15° or less.

Upon mounting the rotor assembly 220 on the shaft 48, the recess 457 bears against the compression spring 459 and the commutator rings 211 bear against the commutator brushes 200, thus urging the rotor assembly 220 outward toward the left end of the shaft 48. Still referring to FIGS. 2 and 4, the rotor assembly 220 includes a slide-latch member or plate 206 with two perpendicular end tabs 256 against which one can press in order to slide the latch 206. The latch 206 is secured to the outside surface of the rotor 28 by means of a pair of rivets 410 in a pair of elongated slots 258. Bowed washers (not shown) are positioned between the rivet heads 410 and the latch 206 in order to ensure a constant frictional engagement between the slide 206 and the surface of the rotor 28, thus holding the slide 206 in the position to which it is moved. A molded block 210 abuts the lower edge of the slide latch 206 to reinforce the holding action of the latch 206. The latch 206 also is provided with a central slot which has an enlarged circular portion 259 which is large enough to pass the end of the shaft 48 through it, and a second portion 260 which has the form of a slot offset from the hole 259 and of a width smaller than the diameter of the hole 259.

When the straight inset edge 262 of slot 260 aligned with the flat recess 207 on the end of the shaft 48, and the latch plate 206 is pushed to the left to the position shown in FIG. 4, the spring 459 and the commutator brushes 200 push outwardly on the rotor 28 so that the straight edge 262 of the slot 260 is wedged tightly against the tapered surface of the recess 207, thereby locking the shaft 48 and rotor 28 together. This lock prevents the rotor 28 from slipping on the shaft 48, and also provides a means for accurately locating the rotor assembly 220 axially. This allows the character message margin location to be accurately preserved when interchanging rotors 28. Furthermore, the latch structure reduces the chances that the rotor 28 will become loose and wobble on the shaft 48.

PLATEN CONSTRUCTION

Referring to FIG. 6, the platen sleeve 26 has an inner surface consising of one region 290 over which the recording paper 36 passes, and a ramp 214. The ramp 214 has a leading portion 294 followed by an inclined portion 293 of gradually increasing wall thickness, a section 296 of uniform thickness, and an end 292 adjacent one edge of the recording paper 36. The thickness of the paper 36 and the ramp 214 are exaggerated in FIG. 6 for the sake of clarity.

As the styli 68 pass over the ramp 214, in a counterclockwise direction, they are gradually deflected inwardly, by a distance slightly greater than the thickness of the recording paper 36. The styli 68 remain deflected until they reach the end 292 of the ramp 214 where they move outwardly onto the paper 36. Thus, the ramp 214 promotes a smooth transition of the styli 68 from contact with the platen sleeve 26 to contact with the recording sheet 36. This eliminates or reduces the bump which the styli 68 otherwise would experience in passing over the edge of the paper 36, and reduces the possibility of tearing of the edge of the paper 36 during the transition.

Not only is tearing of the paper 36 reduced, but the reduction of the bump allows the styli 68 to settle onto the paper 36 more quickly, thus reducing the margin at the leading edge of the sheet 36 and increasing the usable area of the sheet 36.

As an example, in a printer whose platen diameter is four inches, the styli 68 are deflected by the ramp 214 about 0.007 inches from the platen sleeve 26 and maintained there in the area 296 for a distance of approximately 1 inch before reaching the end 292 of the ramp 214, at which point they fall suddenly onto the recording sheet 36 which is approximately 0.003 inch thick. Utilization of such a ramp 214 has reduced the margin distance by approximately one-third. The deflection provided by the ramp 214 should be sufficient to cause the styli 68 to jump the gap between the edge of the sheet 36 and end of the ramp 214 so as to avoid contact between the styli 68 and the edge of the sheet 36.

HOUSING CONSTRUCTION

Referring to FIG. 2, the housing 24 is made of molded plastic parts. Secured to the base plate 22 are front and rear end plates 88 and 70 which have semicircular upper portions and rectangular lower portions. Each end plate 70 and 88 has a recessed ledge 119 (FIG. 7) around its edge against which the edges of a cover plate 189 are seated. The plates 70, 88 and 189 are secured together by means of screws 91 (FIG. 7) extending through flanges 93 in the cover plate 189 and into mating holes in the end plates 70 and 88.

DRIVE TRAIN

Referring to FIGS. 2 and 7, the drive system of the printer 20 includes the drive shaft 48 and the motor 30. The motor 30 is mounted on the rear end plate 70 of the housing 24. The output shaft 76 of the motor 30 is secured to a toothed drive wheel 78 which drives a toothed timing belt 50 to drive a large toothed wheel 52 which is secured to the shaft 48. The sizes of wheels 78 and 52 are such to produce a speed reduction. The speed reduction is set to provide a compromise between motor start-up torque and final described speed, and is approximately 3.6 to 1. The timing disc 54 is secured to the wheel 52 and thus is secured to and rotates with the shaft 48.

The shaft 48 is mounted to rotate on ball bearings in the end plates 70 and 88, and is retained by a retainer washer 108 secured to the shaft 48.

The paper drive roller 56 is driven by gearing it to the shaft 48. The roller 56 is secured to a horizontal shaft 96 which is rotatably mounted on a pair of brackets 89 on the end plate 88. A slot 95 is provided through which the upper surface of the roller 56 extends so as to engage the paper strip 36 as shown in FIG. 7 and press the paper 36 against an idler roller 98 which is mounted rotatably on a shaft 100.

Also secured to the shaft 96 is a bevel gear 94. Gear 94 mates with another bevel gear 92 which is secured to a vertically-aligned shaft 84. Shaft 84 is rotatably mounted in a pair of brackets 90 extending outwardly from the end plate 88. Also secured to the shaft 84 is a worm gear 86 which meshes with a worm 82 which is secured to the drive shaft 48.

The drive train of the printer 20 thus synchronizes the rotation of the timing disc 54, the stylus assembly 220, and the paper feed so that the character formation and spacing will be uniform despite variations in the speed of the drive motor 30. This helps to enable the printer 20 to start printing very quickly after it starts, e.g. within only one half revolution, even though the speed of the rotor 28 is not then even close to normal operating speed.

PAPER GROUNDING MEANS

Referring to FIG. 7, the paper 36 is grounded by making the drive roller 56 conductive and connecting it to electrical ground. The roller 56 contacts the conductive undersurface of the paper 36, thus providing a ground connection to the paper 36.

It has been discovered, contrary to the teachings of others in the past, that it is not necessary for the roller 56 to make contact over the entire width of the paper 36 in order to give a good ground connection. Thus, a relatively narrow roller 56 can be used, and it can be located at a point at which the paper 36 already has been formed into an arc, thus simplifying and reducing the size of the printer 20.

The shaft 96 is in contact with a flat spring electrical contact 215 which bears against the end of the shaft 96 and thus is in continuous contact with the shaft 96 when the shaft 96 is rotating. The spring contact 215 is mounted on the end plate 88 by securing the spring contact 215 to a non-conductive plastic support member 461 which is fastened onto the end plate 88. The ground connection is completed by connecting the spring contact 215 to the return terminal 169 of the voltage supply by means of a wire 216.

The conductive drive roller 56 preferably is made of aluminum with a nickel plating. The use of aluminum ensures low cost, good conductivity, and light weight, while the nickel plating avoids the problems of pitting and corrosion which tend to plague rollers made of aluminum only.

TIMING DISC

Referring again to FIG. 1, the timing disc 54 preferably is made of a thin sheet of corrosion-resistant metal such as stainless steel. It has three sets of etched slots 59 spread around its periphery, together with at least one wide slot 57 for use in forming synchronization signals. An integrated sensor 55 is mounted on the rear end plate 70 so that its arms encompass the edge of the timing disc 54. The unit 55 has a lamp and photocell combination for sensing the slots 57,59 and producing corresponding timing signals, in the manner described in detail in the above-identified patent application, with the exceptions that only one lamp and photocell are used, and also that both the leading and trailing edges of each slot 57,59 are used to create dot timing signals so as to enable the use of wider less costly slots 57,59 without loss of resolution. Also, the frequency of the timing signals is doubled so as to increase the density of dots (decrease the circumferential spacing of the dots) to increase the weight of the printed lines.

Referring to FIG. 2, a snap-on plastic housing 81 covers the timing disc 54 and sensor 55 assembly to protect the latter parts.

The above described invention fully meets the objectives set forth at the beginning of this specification.

The styli 68 can be extended and retracted automatically in a simple manner which ensures positional accuracy, long life and simplicity of manufacture, operation and repair. Means are provided for adjusting the circumferential position of the styli 68 and the transverse (axial to the rotor) angle between the styli 68 and the recording sheet 36. An improved latching means for securing the rotor 28 to the drive shaft 48 also is provided. All these features cooperate to ensure a rotor assembly structure which is structurally sound, stable and long-lasting.

The styli 68 can be replaced easily by an inexperienced user of the printer 20 simply by removing the rotor assembly 220, replacing it with a spare, and sending the worn unit to the manufacturer for replacement of the styli 68.

MATERIALS AND SPECIFICATIONS

Following is a list for some of the plastic materials of a printer which has been constructed and successfully tested in accordance with the present invention.

| COMPONENT | MATERIAL |
| --- | --- |
| Platen and rotor | Glass-filled phenolic resin with 35% glass fibers |
| End plates, printer housing and paper guide | SAN with 35% glass fibers |
| Rear Cover | High density polyethylene |
| Rotor Housing | Phenylene Oxide-based resin |
| Timing Belt | Fiberglass reinforced neoprene, nylon faced |
| Computer Disc | Epoxy or Phenolic/Paper Laminate |
| Support Block, Cap and Header | Polycarbonate |
| Leaf Spring | Epoxy/Glass Laminate |

The above description of the invention is intended to be illustrative and not limiting. Various changes or modifications in the embodiments described may occur to those skilled in the art and these can be made without departing from the spirit of the invention.

We claim:

1. In or for a rotary printer including a shaft, a rotor mounted on said shaft, a stylus mounted on said rotor for printing on a recording sheet and support means for supporting the stylus on the rotor for movement between extended outward recording and retracted inward non-recording positions relative to the axis of rotation of said rotor; said support means including an elongated resilient stylus support member, a mounting member secured to said rotor, said stylus support member being attached adjacent one of its ends to said mounting member, said stylus being attached to said stylus support member adjacent its other end, said support member being flexible in a direction towards and away from the axis of rotation of said rotor, being substantially rigid in the axial direction, and being mounted so as to bias said stylus towards said inward position, whereby upon rotation of said rotor said stylus support member permits the stylus to move outwardly from the axis of rotation of said rotor to said extended recording position under the influence of centrifugal force.

2. A device as recited in claim 1, wherein said stylus support member is a flat, thin leaf spring made out of fiberglass.

3. A device as recited in claim 1, including a plurality of said stylus support members mounted on said rotor symmetrically with respect to said axis, a group of styli secured near said other end of each of said stylus support members, and means for securing the styli of each group together in a closely-spaced parallel array.

4. A device as recited in claim 1, wherein said stylus support member comprises a relatively thin, flat leaf spring made of insulating material, and terminal means on said leaf spring for making an electrical connection to said stylus.

5. A device as recited in claim 1, including a stop means mounted on said rotor for adjustably limiting said outward movement of said stylus support member when said stylus has reached the desired outward recording position.

6. A device as recited in claim 1, including means for adjustably pivoting said mounting member on said rotor to move said stylus axially and adjust the positioning of said stylus.

7. A device as recited in claim 5, wherein said stop means includes a surface positioned to be substantially perpendicular to the rotor and to contact the surface of said support member when said stylus is in the outward extended recording position in such a manner that the contact surfaces of the support member and stop means are substantially parallel.

8. A rotary printer as recited in claim 7, wherein said stop means comprises a relatively stiff block mounted on the rotor, the block having a first end to which said one end of said stylus support member is attached, and a second end positioned to intercept said stylus support member and thus act as a stop.

9. A device as recited in claim 1, further comprising a weight mounted on the stylus support member near the stylus for urging said stylus outwardly under centrifugal force toward the recording position.

10. In or for a rotary printer, including a shaft, a rotor mounted on said shaft, a stylus mounting structure having two ends, one of said ends being secured to said rotor, a stylus mounted on the other of said ends of said structure, said mounting structure being flexible in the axial direction of said shaft and adjustment means for flexing said mounting structure and thus moving said one end of said mounting structure axially to cause corresponding axial adjustment of the position of said stylus.

11. A device, as recited in claim 10, wherein said mounting structure has a section of reduced thickness between its first and second ends, and said adjustment means comprises a screw engaging said rotor and said first end of said mounting structure.

12. In or for a rotary printer including a shaft, a rotor mounted on said shaft, a stylus mounting structure, a stylus mounted on said structure, a spline—and—groove combination on said rotor and said structure, with said spline and groove being aligned in a direction generally tangent to the stylus tip, and securing means for selectively securing said spline and groove together to adjust the circumferential position of said stylus.

13. A device, as recited in claim 12, wherein said securing means includes an adjustment slot formed in said rotor and a screw extending through said slot and threadedly engaged with said structure whereby said screw may be moved in the slot to adjust said spline and groove, and when tightened will hold said stylus in a fixed position on the rotor.

14. A rotary printer for printing on a recording sheet including a generally cylindrical electrically insulating platen sleeve having an inner surface, a rotor rotatably mounted in said printer and encircled by said platen sleeve, a stylus mounted on said rotor to make contact with said platen sleeve, said recording sheet having a path of travel between the inner surface of said platen sleeve and said rotor in a direction substantially perpendicular to the direction of rotation of said rotor, the inner surface of said platen sleeve including a ramp portion having a radius which gradually decreases in the direction of motion of said stylus and ends adjacent the edge of the path of travel of said recording sheet.

15. A device, as recited in claim 14, wherein said ramp portion has a radius at a point adjacent the edge of the path of travel of said recording sheet which is less than the radius of said platen sleeve in said path of travel by the thickness of said recording sheet, whereby said stylus is gradually deflected inwardly from its outwardly-extended recording position as said stylus passes along said ramp portion toward the edge of the recording sheet where said ramp portion ends, allowing said stylus to extend outwardly and contact the recording sheet adjacent said edge.

16. In or for a rotary printer, a rotor, a housing secured to said rotor, a stylus adjustably mounted within said housing for motion between a retracted non-recording position inside of said housing and an extended recording position outside of said housing, said housing having an opening positioned in the path of movement of said stylus so as to allow said stylus to extend outside of said housing to said recording position, a commutator disc, a means for mounting said commutator disc on said rotor such that the disc and rotor are concentric and parallel, and such that said stylus can be mounted on said rotor between the surfaces of said rotor and disc; said housing being mounted on said rotor and extending to said disc, and means for securing said housing on said rotor.

17. A device, as recited in claim 16, said housing having an inner edge adjacent to said commutator disc and an outer edge abutting the surface of the rotor wherein said means for securing said housing on said rotor includes a tab on said inner edge of said housing and an inwardly-extending bead secured to said tab, said bead being spaced from said inner edge of said housing by an amount sufficient to seat the bead under the edge of said commutator disc.

18. A device, as recited in claim 17, said rotor having a semicircular ridge along its outer perimeter, said ridge having a gap, said housing having an inside wall which includes a pair of axially extending ridges adjacent opposite edges of said opening in said housing, said axially extending ridges being spaced as to fit into the said gap, whereby said opening will be properly aligned such that the stylus can extend and retract through the opening.

19. In or for a rotary printer comprising a motor, a drive shaft for said motor, a rotor mounted on said shaft for rotation therewith, a housing removably mounted on said rotor, a printing stylus mounted on the rotor, said housing having an opening through which said stylus can extend for printing, and means for retracting said stylus within said housing when said rotor is rotating at a speed below a predetermined level, and for extending said stylus outwardly through said opening under the influence of centrifugal force when said rotor is rotating at a speed above a predetermined level.

20. A rotary printer having a longitudinal drive shaft with first and second ends, a rotor having a hole for slidably mounting said rotor on said drive shaft adjacent said first end, stylus means on said rotor, said drive shaft having a flat tapered recess adjacent said first end, with the thickness of the shaft in said recess decreasing at increasing axial distances from said one end, and latch means for selectively engaging said recess for preventing rotation between said shaft and rotor, and to hold said rotor on said shaft, said latch means having a straight edge for selectively engaging said flat tapered recess, and spring means for biasing said rotor towards said first end of the shaft and urging said latch means into contact with said shaft in said tapered recess, whereby said rotor is fixed in a longitudinal and rotational position on said shaft.

21. A rotary printer as recited in claim 20, said latch means comprising a latch member slidably mounted on said rotor for movement between a non-engaged unlocked position and an engaged locked position relative to said shaft, said latch member having a slot therein including a first section having an opening to receive said shaft therethrough, and a lateral section of a width less than the full diameter of said shaft, said slot forming said straight edge.

* * * * *